United States Patent Office 3,361,005
Patented Jan. 2, 1968

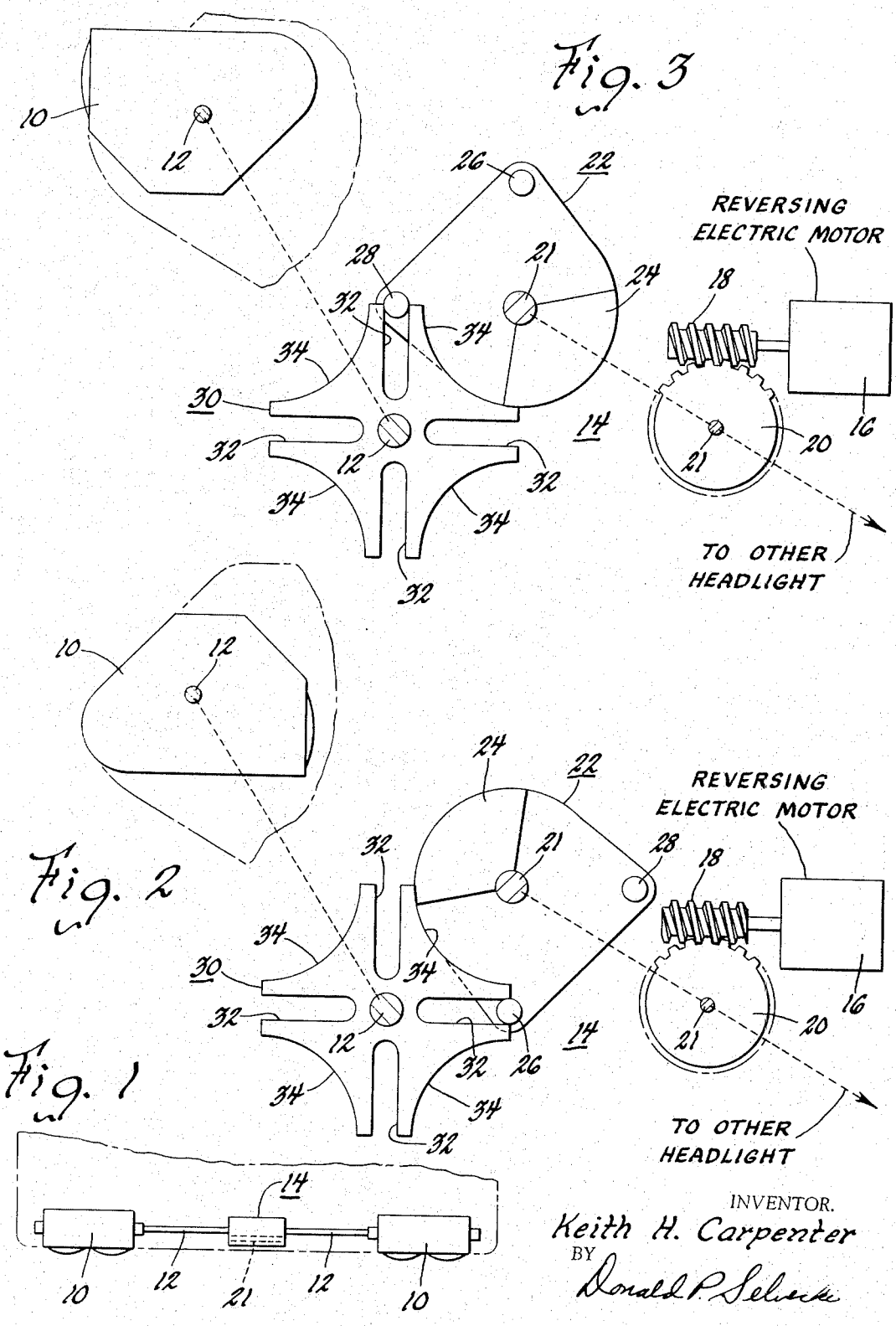

3,361,005
HEADLAMP ACTUATOR
Keith H. Carpenter, Kettering, Ohio, assignor to General Motors Corporation, Detroit, Mich., a corporation of Delaware
Filed Dec. 15, 1965, Ser. No. 514,003
4 Claims. (Cl. 74—436)

ABSTRACT OF THE DISCLOSURE

In a preferred form, the subject invention relates to headlamp positioning apparatus utilizing a Geneva lock type drive mechanism adapted to rotationally move a headlamp assembly more than 90° from a hidden position to a position wherein the headlamps are aimed and locked.

---

This invention relates to actuating mechanisms and more particularly to an actuator for vehicle headlamps which positively positions the headlamps during every phase of movement from a parked position to an operative position.

The new designs of certain vehicles has necessitated the mounting of the headlamps behind the sheet metal near the front of the vehicle. The mounting of the headlamps requires that they be moved from a poised or parked position wherein they are concealed to an operative position wherein they are directed to the front of the vehicle in which they are mounted. One of the methods devised for bringing about the operative positioning of headlamps is to rotate headlamps mounted on a bar more than 90° from a poised position to an operative position. One of the problems associated with movement of headlamps of this type is the movement therein induced by vibrations generated by the vehicle as it traverses various types of road surfaces. It is, therefore, necessary to provide a driving mechanism which positively positions a headlamp to a new operative location within the headlamp and which will maintain the headlamp very positively positioned in order to guarantee a pretermined desired headlamp alignment.

It is an object of the present invention to provide an improved actuating mechanism for repositioning vehicle headlamps which is positive in operaton and which includes mechanism for positively positioning the headlamps at the extremes of travel.

It is another object of the present invention to provide improved actuating mechanism for moving the vehicle headlamps from a poised position to an operative position which allows no lost motion between a drive means and a headlamp during a repositioning thereof and which results in a very positive location of the headlamp exactly in a predetermined position wherein the headlamps will repeatedly direct a beam of light in an exact predetermined pattern relative to the vehicle.

It is still another object of the present invention to provide an improved actuating mechanism which will carry out the aforementioned objects in an economical manner while not detracting from the continuity and accuracy of operation over a prolonged period of time.

Further objects and advantages of the present invention will be apparent from the following description, reference being had to the accompanying drawings wherein a preferred embodiment of the present invention is clearly shown.

In the drawings:

FIGURE 1 is a diagrammatic illustration of the subject invention in its operative environment.

FIGURE 2 is an exploded elevational view of the subject invention showing the headlamps in a parked position.

FIGURE 3 is an exploded elevational view of the subject invention with the headlamps shown in an operative position.

Referring to FIGURE 1 headlamp assemblies 10 are illustrated as being mounted on opposite ends of a split rotatable bar 12. A torque producing means 14 such as an electric motor is shown centrally positioned with respect to the headlamp assemblies 10 and includes the subject actuating mechanism for rotating the headlamp assemblies 10 from the position shown in FIGURE 1 which is also the position shown in FIGURE 3 to a parked position as seen in FIGURE 2.

Referring to FIGURE 2 a reversing electric motor 16 has an output worm drive 18 cooperating with a rotatable gear 20 positioned transversely on rotatable shaft 21 to impart rotational position thereto. The longitudinal axes of the bars 12 and shaft 21 are substantially parallel. Any well known stop mechanism such as a limit switch can be utilized to stop the electric motor 16 when the headlamp assemblies have traversed the desired arc between the operative and parked positions.

A drive means 22 sometimes referred to herein as the first means is mounted on one portion of a shaft 21 in a fixed manner and adapted to rotate therewith. Drive means 22 has a raised cam portion 24 and a plurality of lugs 26 and 28 which swing in an arc around shaft 21 during rotation thereof. It should be understood that the description will be limited to one headlamp assembly and one bar 12 whereas in the actual operative environment two bars 12 and associated headlamp mechanism would be involved. Therefore, shaft 21 carried by a fixed portion of the vehicle has a plurality of drive means 22 spaced on either side thereof adapted to engage positioning means 30 to be hereinafter described.

Positioning means 30 is fixedly carried by bar 12 which in turn is rotatably carried by a fixed portion of the vehicle. Positioning means 30 generally comprises slots 32 equally spaced 90° apart extending radially from bar 12. Slots 32 cooperate with lugs 26 and 28 in a manner hereinafter described. Cam follower portions 34 are formed in positioning means 30 between slots 32 and operatively engage cam portions 24 during periods of time when the headlamp assembly 10 is either in the parked position or in the operative position but not in the intermediate positions.

In operation the headlamp assembly 10 would be in the parked position as illustrated in FIGURE 2. When the vehicle operator desires the headlamp to be put into the operative position a switch on the dashboard of the vehicle is operated in any well known manner resulting in the energization of electric motor 16. As motor 16 turns, worm drive 18 rotates gear 20 causing bar 21 to rotate therewith. Drive means 22 carried by bar 21 rotates in a clockwise manner as viewed in FIGURE 2 resulting in a counterclockwise rotation of positioning means 30 toward the position shown in FIGURE 3.

As seen in FIGURE 2 lug 26 cooperates with the end of one of the slots 32 when the headlamp assembly 10 is in the parked position and when drive means 22 is rotated in a clockwise manner, positioning means 30, cooperating with lug 26, is reversely rotated. As lug 26 rotates through 90° lug 28 picks up the adjacent slot 32 and continues the rotation until the relationship of parts seen in FIGURE 3 is attained.

It will be noted that cam portion 24 initially engaging one of the cam follower portions 34 leaves positioning means 30 almost immediately as rotation thereof commences and reengages an oppositely positioned cam follower portion 34 when rotation has continued through 180° to the position shown in FIGURE 3. It is understood that in the example given 180° of rotation of the headlamp assembly 10 is illustrated, but it is understood that a limit switch could be caused to shut off the motor 16 at any point between 90° of rotation and 180° of rotation of drive means 22 while still maintaining the use of the inventive concept discussed herein wherein the headlamp assembly 10 is positively driven in the area between 90° and 180° of rotation by the cooperation of lugs 26 or 26 in a slot 32.

In ordinary Geneva lock type mechanisms there is a limited consecutive operation of 90° and therefore is not useful in an environment such as illustrated herein where rotation of the headlamps is required in excess of 90°.

The addition of the extra lug to a Geneva lock mechanism enables the continuous controlled movement of one rotatable member relative to another through more than 90° and likewise prevents casual relative rotation therebetween of a type not designed into the mechanism.

With the headlamp assembly 10 in the operative position and it is desired to move the assembly to the parked position, a simple switch actuation in the driving compartment will result in the reversing electric motor operating to cause the drive means 22 to reposition headlamp assembly 10 through positioning means 30 to the parked position shown in FIGURE 2. At the end of the desired travel a limit switch or some other well-known means would be typically provided to stop the electric motor and the headlamp assembly is automatically locked in that newly assumed position by the subject invention.

While the embodiment of the present invention as herein disclosed, constitutes a preferred form, it is to be understood that other forms might be adopted.

What is claimed is as follows:

1. Headlamp actuating mechanism for vehicle headlamps that are adapted to be rotated from a parked position to an operative position more than 90° from the parked position; said actuating means comprising: an electric motor, rotatable means carrying the headlamps and adapted to rotate more than 90° from a point where the headlamps are concealed within a vehicle body to a point where the headlamps are directed from a predetermined position at the front of the vehicle; gear means engaging said electric motor and said rotatable means; drive means including lug means and guide means rotatably drivable by said gear means and carried by a portion thereof; and positioning means carried by said rotatable means and rotatable therewith, said positioning means including portions engaging said lug means for transmitting rotational movement of said drive means to said rotatable means thereby positioning the headlamps from a parked position to an operative position and positively holding said rotatable means exactly in the predetermined operative position.

2. Actuating mechanism according to claim 1 wherein said rotatable means is a bar carrying at least one of a plurality of headlamp assemblies from a concealed position within the body of a vehicle to an operative position wherein the headlamps are exposed, said rotatable means being rotated by said positioning means more than 90° on an arc around said rotatable means.

3. Actuating mechanism according to claim 1 wherein said lug means engages said positioning means for more than 90° of rotation thereof and said positioning means engages said guide means to maintain support for said positioning means relative to said drive means during phases of cooperation between said drive means and positioning means while said headlamps are positioned at extremes of movement.

4. A headlamp actuating mechanism for vehicle headlamps comprising: a reversible electric motor driving a worm gear output shaft to rotate a gear; a rotatable member carried on said gear to rotate therewith and having a plurality of lugs thereon extending from a face thereof radially positioned from the center thereof less than 90° apart, said rotatable member also including a cam surface on an edge thereof; and a Geneva type gear axised common to a rotatable headlamp assembly and including slotted portions peripherally positioned from the axis thereof arranged to successively engage the lugs extending from the face of said rotatable member to induce rotational movement in the headlamp assembly of more than 90° and less than 180°, said Geneva type gear having cam surfaces engaging the cam surfaces of said rotatable member during operative periods when only one lug engages said slots to positively control the rotative movement of the headlamp assembly.

References Cited

UNITED STATES PATENTS

| | | | |
|---|---|---|---|
| 719,198 | 1/1903 | Cyr | 74—436 |
| 959,119 | 5/1910 | Davis | 74—436 |
| 1,656,527 | 1/1928 | Messinger et al. | |
| 2,469,106 | 5/1949 | Dickerman | 74—435 X |
| 2,598,448 | 5/1952 | Schultz | 74—436 |
| 2,605,647 | 8/1952 | Duvoisin | 74—436 |
| 3,260,128 | 7/1966 | Gassino et al. | 74—435 |

DONLEY J. STOCKING, *Primary Examiner.*

ROBERT M. WALKER, *Examiner.*

L. H. GERIN, *Assistant Examiner.*